United States Patent
Chau et al.

(10) Patent No.: US 9,575,864 B2
(45) Date of Patent: Feb. 21, 2017

(54) FUNCTION-LEVEL DYNAMIC INSTRUMENTATION

(71) Applicant: Microsoft Corporation, Redmond, WA (US)

(72) Inventors: Joe Chau, Redmond, WA (US); Jay Krell, Redmond, WA (US); Allan Murphy, Redmond, WA (US); Danny Chen, Redmond, WA (US); Hoi Vo, Redmond, WA (US); Steven Pratschner, Duvall, WA (US); Galen Hunt, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/453,457

(22) Filed: Aug. 6, 2014

(65) Prior Publication Data
US 2015/0347263 A1    Dec. 3, 2015

Related U.S. Application Data

(60) Provisional application No. 62/006,268, filed on Jun. 2, 2014.

(51) Int. Cl.
*G06F 9/44* (2006.01)
*G06F 11/34* (2006.01)
(Continued)

(52) U.S. Cl.
CPC ....... *G06F 11/3409* (2013.01); *G06F 11/3003* (2013.01); *G06F 11/3093* (2013.01);
(Continued)

(58) Field of Classification Search
None
See application file for complete search history.

(56) References Cited

U.S. PATENT DOCUMENTS

| 6,189,141 | B1 * | 2/2001 | Benitez | G06F 8/443 |
| | | | | 714/E11.209 |
| 6,928,639 | B2 * | 8/2005 | Juan | G06F 11/3466 |
| | | | | 714/E11.207 |

(Continued)

*Primary Examiner* — Wei Zhen
*Assistant Examiner* — Hossain Morshed
(74) *Attorney, Agent, or Firm* — Gregg Wisdom; Judy Yee; Micky Minhas

(57) ABSTRACT

Methods for dynamically instrumenting a program while the program is executing are described. In some embodiments, profiling hooks may be selectively inserted into and removed from a program while the program is running. The hooks may gather profiling information, such as the frequency and duration of function calls, for a selected set of functions. The hooks may be inserted into the program without requiring a special build or modifications to the binary by modifying machine-level instructions for the program stored in system memory. The ability to selectively insert instrumentation into the machine-level instructions stored in the system memory allows a set of functions to be selected during execution of the program and hooks for each function of the set of functions to be dynamically inserted or removed during execution of the program to precisely capture profiling information for the set of functions.

20 Claims, 8 Drawing Sheets

(51) Int. Cl.
*G06F 11/30* (2006.01)
*G06F 11/36* (2006.01)

(52) U.S. Cl.
CPC .......... *G06F 11/3466* (2013.01); *G06F 11/36* (2013.01); *G06F 11/3419* (2013.01); *G06F 2201/81* (2013.01); *G06F 2201/835* (2013.01); *G06F 2201/865* (2013.01)

(56) References Cited

U.S. PATENT DOCUMENTS

| | | | | |
|---|---|---|---|---|
| 7,805,717 | B1* | 9/2010 | Spertus | G06F 8/48 717/130 |
| 8,176,480 | B1* | 5/2012 | Spertus | G06F 8/443 717/127 |
| 8,639,982 | B2* | 1/2014 | Bhat | G06F 11/3636 714/33 |
| 2002/0152455 | A1* | 10/2002 | Hundt | G06F 11/3664 717/131 |
| 2003/0041316 | A1* | 2/2003 | Hibbeler | G06F 11/3423 717/130 |
| 2004/0003375 | A1* | 1/2004 | George | G06F 11/3466 717/124 |
| 2004/0163077 | A1* | 8/2004 | Dimpsey | G06F 11/3466 717/130 |
| 2006/0236309 | A1* | 10/2006 | George | G06F 11/3466 717/133 |
| 2008/0052696 | A1* | 2/2008 | Pradadarao | G06F 11/3644 717/158 |
| 2008/0209525 | A1* | 8/2008 | Ben-Shoshan | G06F 21/126 726/4 |
| 2010/0318994 | A1* | 12/2010 | Holmberg | G06F 11/3433 718/100 |
| 2011/0138368 | A1* | 6/2011 | Krauss | G06F 11/3466 717/133 |
| 2011/0218654 | A1* | 9/2011 | Trautmann | G06F 8/443 700/31 |
| 2011/0283265 | A1* | 11/2011 | Gagliardi | G06F 11/3644 717/130 |
| 2012/0089966 | A1* | 4/2012 | Martin | G06F 11/3466 717/133 |
| 2012/0173818 | A1* | 7/2012 | Martin | G06F 12/0895 711/118 |
| 2014/0101672 | A1* | 4/2014 | Holmberg | G06F 11/3433 718/105 |
| 2014/0282416 | A1* | 9/2014 | Shepherd | G06F 11/3644 717/125 |
| 2014/0310561 | A1* | 10/2014 | Zhang | G06F 11/3636 714/38.1 |
| 2015/0067661 | A1* | 3/2015 | Hanssen | G06F 8/443 717/158 |

\* cited by examiner

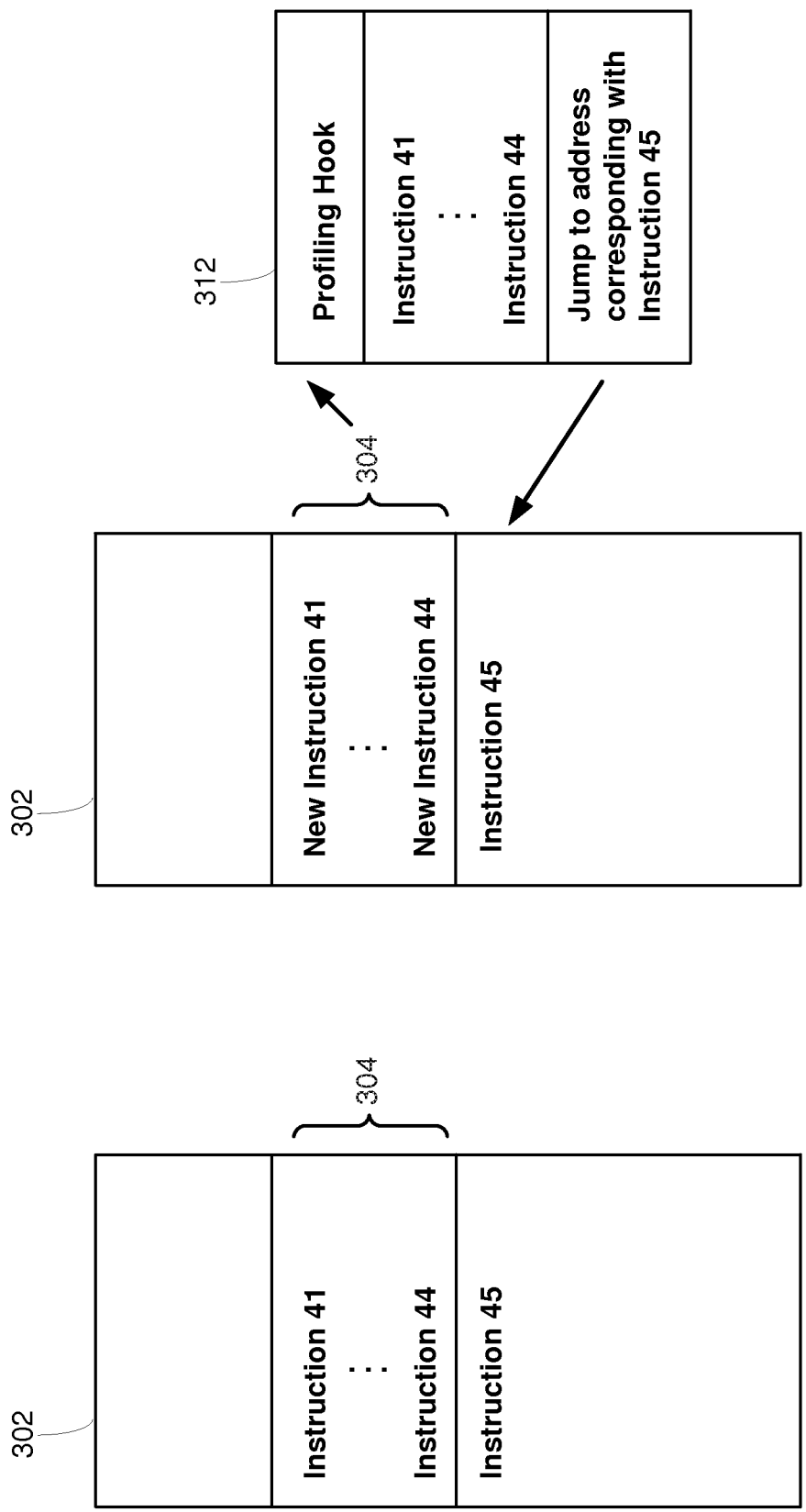

FUNCTION-LEVEL DYNAMIC INSTRUMENTATION

CLAIM OF PRIORITY

The present application claims priority to U.S. Provisional Application No. 62/006,268, entitled "Function-Level Dynamic Instrumentation," filed Jun. 2, 2014, which is herein incorporated by reference in its entirety.

BACKGROUND

Code profilers may include sampling profilers and instrumented profilers. Sampling profilers work by examining the state of a running program at regular time intervals (e.g., sampling at time intervals based on a number of clock cycles or page faults) to determine which function is executing. The advantages of sampling profilers include their ability to be used on any existing program (e.g., no special build is needed to use the profiler) and their ability to introduce minimal disruption to the running program. However, because the sampled data is taken at regular time intervals, a sampling profiler may not be able to provide a complete or precise view of the performance characteristics of the running program. Instrumented profilers require a program to be built in a special way in order to be profiled. Programs that can be examined with an instrumented profiler are built (or post-processed) with options that insert instrumentation hooks (or probes) into the binary at function entry and exit points. These hooks are then invoked when the program is running in order to collect profiling data. The advantage of an instrumented profiler is the large amount of profiling information that it can collect. For example, an instrumented profiler may collect complete call counts and map performance counters back to functions. However, in addition to requiring a special build in order to be used, instrumented profilers may distort a running program. For example, inserting the profiling hooks may change a compiler's ability to inline functions thereby changing runtime performance.

SUMMARY

Technology is described for dynamically instrumenting a program (e.g., a gaming application) during run-time. In some embodiments, function entrance and exit profiling hooks may be selectively inserted into and removed from a program while the program is running. The hooks may gather profiling information, such as the frequency and duration of function calls, for a selected set of functions. The hooks may be inserted into the program without requiring a modification of the program's binary by modifying machine-level instructions for the program stored in system memory. The ability to selectively insert instrumentation into the machine-level instructions stored in the system memory allows a set of functions to be selected during execution of the program and hooks for each function of the set of functions to be dynamically inserted or removed during execution of the program to precisely capture profiling information for the set of functions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 3A-3B depict one embodiment of a system memory and modifications made to the system memory for inserting instrumentation into a program.

DETAILED DESCRIPTION

Figure 1:
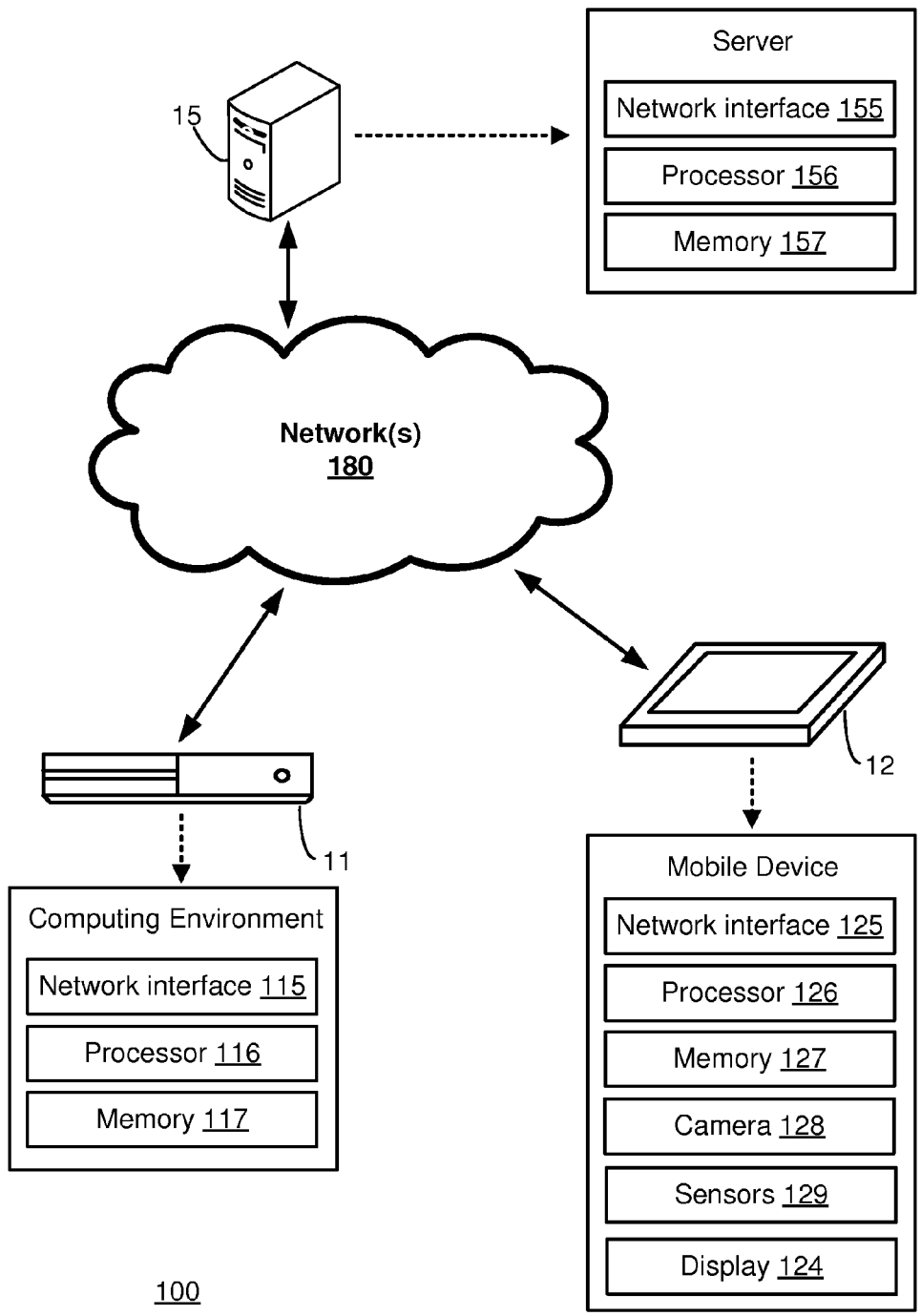
FIG. 1 is a block diagram of one embodiment of a networked computing environment.

Technology is described for dynamically instrumenting a program while the program is running. In some embodiments, profiling hooks (e.g., function entrance and exit profiling hooks) may be selectively inserted into and removed from a program while the program is running. The hooks may gather profiling information, such as the frequency and duration of function calls, for a selected set of functions. The hooks may be inserted into the program without requiring a special build or modifications to the binary by modifying or replacing machine-level instructions for the program stored in system memory. The ability to selectively insert instrumentation into the machine-level instructions stored in the system memory allows a set of functions to be selected during execution of the program and hooks for each function of the set of functions to be dynamically inserted or removed during execution of the program to precisely capture profiling information for the set of functions. In one example, while a program (e.g., a gaming program) is running, a set of functions may be automatically selected or selected by a developer for instrumentation, memory addresses for machine-level instructions stored in a system memory corresponding with the set of functions may be determined, hooks may be inserted into and removed from the system memory based on the memory addresses, profiling information for the set of functions may be acquired in response to inserting the hooks, and the profiling information may be outputted while the program is running.

In some cases, a program developer of a program may use a profiler (or a program profiler) to acquire profiling information on-demand during run-time of the program to investigate program behavior and to identify functions responsible for run-time issues and/or performance issues affecting the program. In one example, the profiler may generate profiling information regarding function call counts, caller identification, callee identification, time stamps associated with entering and exiting a particular function, the time duration for each function call, and whether the time duration for a particular function call was greater than a baseline time duration by a threshold amount of time. The ability to select a subset of functions may allow the program developer to profile only functions that run in a certain part of the program (e.g., only functions that are part of a video game program, and not operating system specific functions) or to profile only functions that interact with a particular software or hardware resource (e.g., a particular storage device, processor, or file system). Given the profiling information, the program developer may, for example, identify that a first function was called more than 500 times within a 30 second time period and that whenever a second function called the first function, the time duration for the first function was longer than a baseline time duration for the first function by a threshold amount of time (e.g., the first function may typically complete within 1 ms, but took more than 5 ms to complete whenever the second function called the first function).

One benefit of dynamically instrumenting a program during run-time is that the debug or program development time may be reduced since there is no build-time overhead required to instrument the program (e.g., an updated binary does not need to be generated for the program). Moreover, as the binary for the program does not need to be touched to insert instrumentation, a program developer or tester may directly profile the actual program that may be shipped to customers or has already been shipped to customers. Thus, dynamically instrumenting a program while the program is running may provide the advantages of both sampling and instrumented profiling without the corresponding drawbacks.

In some embodiments, a profiler may attach or detach instrumentation for a set of functions on-demand while a program is running without requiring a modification to the program's binary by modifying or replacing machine-level instructions associated with the binary being executed from a system memory. In one example, inserting instrumentation into a first function of the program stored in a system memory may include copying an original first instruction associated with the first function to a second region within the system memory and overwriting the original first instruction such that the first instruction that executes when the first function is called is a call to a function entrance profiling hook. The function entrance profiling hook may collect data related to the number of times that the first function has been called, the time at which the first function started to execute, the values of various system performance counters, information about the caller of the first function (which may be used to construct call graphs), and information regarding which thread or processor the first function is running on. The first instruction that calls the function entrance profiling hook may be followed by the original first instruction which may then be followed by a jump to a second instruction of the first function that originally followed the original first instruction. In some cases, the first function's return address may be modified to redirect program execution to a function exit profiling hook. The function exit profiling hook may collect data related to the time at which the first function finished executing and the values of various system performance counters. After the function exit profiling hook has completed and exits, program execution may be transferred back to the first function's original return address.

In one embodiment, a program profiler for monitoring a program may dynamically modify machine-level instructions stored in a system memory in order to monitor specific portions of the program (e.g., portions of the program associated with image processing or graphics rendering) or to monitor specific functions within the program during run-time of the program. In one example, a program profiler may be used by a developer of a program (e.g., a game developer) in order to dynamically insert function entrance and exits hooks into specific functions or into functions that are part of a group or library (e.g., functions associated with an image processing library or with a graphical user-interface for the program).

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include computing environment 11, mobile device 12, and server 15. The computing environment 11 may comprise a gaming console for playing video games. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

One embodiment of computing environment 11 includes a network interface 115, processor 116, and memory 117, all in communication with each other. Network interface 115 allows computing environment 11 to connect to one or more networks 180. Network interface 115 may include a wireless network interface, a modem, and/or a wired network interface. Processor 116 allows computing environment 11 to execute computer readable instructions stored in memory 117 in order to perform processes discussed herein.

In some embodiments, the computing environment 11 may include one or more CPUs and/or one or more GPUs. In some cases, the computing environment 11 may integrate CPU and GPU functionality on a single chip. In some cases, the single chip may integrate general processor execution with computer graphics processing (e.g., 3D geometry processing) and other GPU functions including GPGPU computations. The computing environment 11 may also include one or more FPGAs for accelerating graphics processing or performing other specialized processing tasks. In one embodiment, the computing environment 11 may include a CPU and a GPU in communication with a shared RAM. The shared RAM may comprise a DRAM (e.g., a DDR3 SDRAM).

Server 15 may allow a client or computing device to download information (e.g., text, binary, application, audio, image, and video files) from the server or to perform a search query related to particular information stored on the server. In one example, a computing device may download purchased downloadable content and/or user generated content from server 15 for use with a video game development environment running on the computing device. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, and memory 157, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein.

One embodiment of mobile device 12 includes a network interface 125, processor 126, memory 127, camera 128, sensors 129, and display 124, all in communication with each other. Network interface 125 allows mobile device 12 to connect to one or more networks 180. Network interface 125 may include a wireless network interface, a modem, and/or a wired network interface. Processor 126 allows mobile device 12 to execute computer readable instructions stored in memory 127 in order to perform processes discussed herein. Camera 128 may capture color images and/or depth images of an environment. The mobile device 12 may include outward facing cameras that capture images of the environment and inward facing cameras that capture images of the end user of the mobile device. Sensors 129 may generate motion and/or orientation information associated with mobile device 12. In some cases, sensors 129 may comprise an inertial measurement unit (IMU). Display 124 may display digital images and/or videos. Display 124 may comprise an LED or OLED display. The mobile device 12 may comprise a tablet computer.

In some embodiments, various components of a computing device including a network interface, processor, and memory may be integrated on a single chip substrate. In one example, the components may be integrated as a system on a chip (SOC). In other embodiments, the components may be integrated within a single package.

In some embodiments, a computing device may provide a natural user interface (NUI) to an end user of the computing device by employing cameras, sensors, and gesture recognition software. With a natural user interface, a person's body parts and movements may be detected, interpreted, and used to control various aspects of a computing application running on the computing device. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one embodiment, a program (e.g., a gaming application, a computer graphics rendering application, or a business transaction management application) running on a computing environment, such as computing environment 11, may be dynamically instrumented while the program is running on the computing environment. In some cases, profiling hooks (e.g., function entrance and exit profiling hooks) may be selectively inserted into the program while the program is running. The hooks may gather profiling information, such as the frequency and duration of function calls, for a selected set of functions associated with the program. The hooks may be inserted into the program without requiring modifications to the binary by modifying machine-level instructions for the program stored in system memory.

In one embodiment, a first set of profiling information for a first set of functions used by a program (e.g., the number of function calls for a particular function or the percentage of execution time consumed by the particular function) may be generated during a first period of time and hooks may be automatically inserted into and/or removed from the system memory during run-time of the program subsequent to the first period of time based on the first set of profiling information. In one example, the first set of functions may comprise every function in the program and the first set of profiling information may include the cumulative time duration for each of the first set of functions during the first period of time. Based on the first set of profiling information, a profiler may automatically remove hooks corresponding with a subset of the first set of functions in which each function of the subset has a cumulative time duration that is below a threshold time duration (e.g., hooks may be removed from functions that consumed less than 1% of the first period of time). In some cases, the first period of time may comprise two seconds and the threshold time duration may comprise 10 ms. In another example, the profiler may automatically remove hooks corresponding with a subset of the first set of functions in which each function of the subset ran within a baseline time duration for the function during the first period of time. In some cases, a baseline time duration for each function may be determined based on run-time statistics for the program over a previous period of time prior to the first period of time. If a particular function was called during the first period of time and ran for a time duration that was greater than the baseline time duration for the particular function, then the function entrance and exit hooks may preserved and not be removed subsequent to the first period of time. In another example, the profiler may automatically remove hooks corresponding with a subset of the first set of functions in which each function of the subset was called less than a threshold number of times during the first period of time (e.g., hooks may be removed from functions that were called less than three times during the first period of time).

Figure 2:
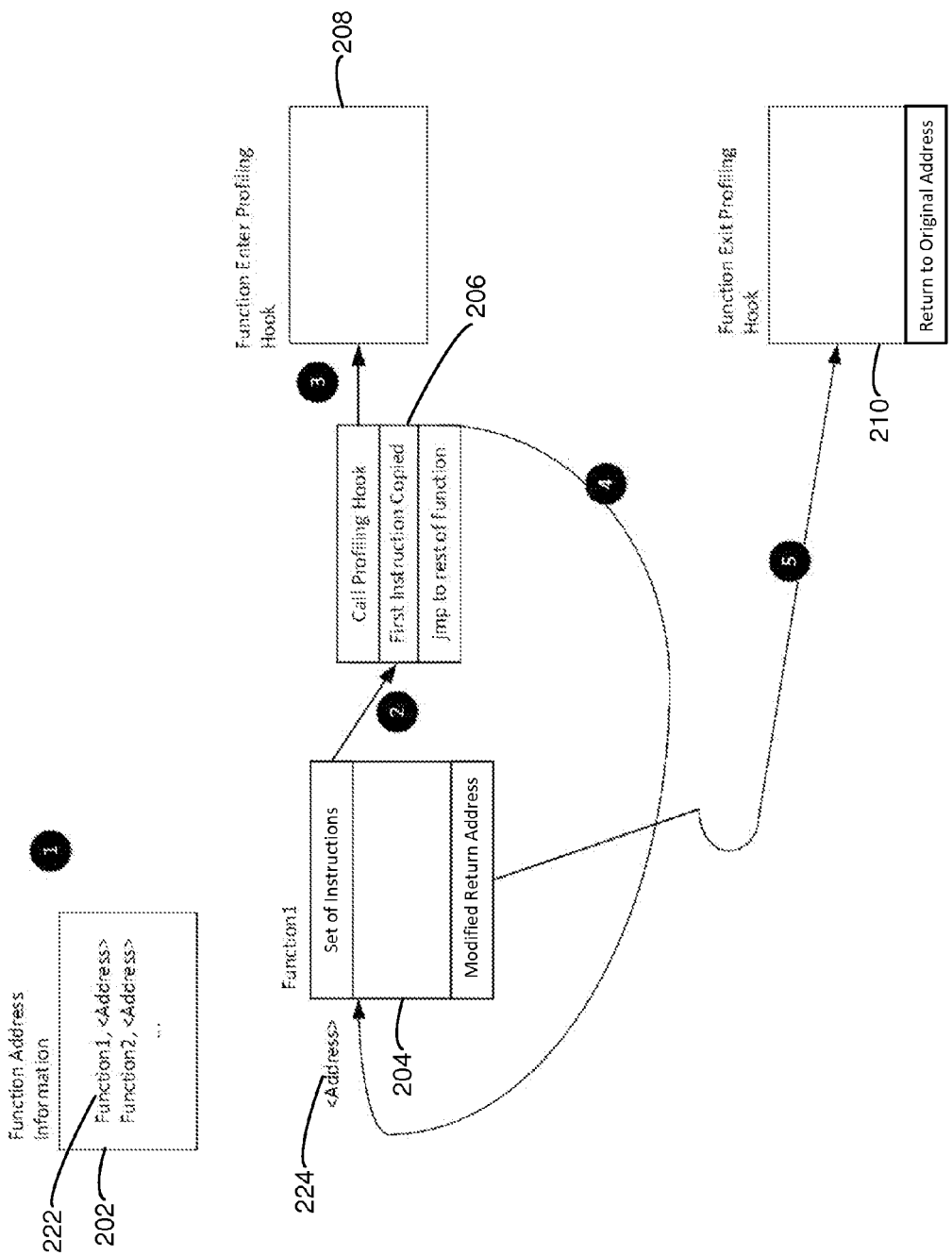
FIG. 2 depicts one embodiment of a process flow for inserting instrumentation into a program.

FIG. 2 depicts one embodiment of a process flow for inserting instrumentation into a program. Once a first function 222 (e.g., Function1) has been identified for profiling, a mapping table 202 may be used for determining a memory address corresponding with a first machine-level instruction for the first function 222 within a system memory. The system memory 204 may comprise a random-access memory (RAM). The RAM may comprise a non-volatile memory or a volatile memory. The system memory may store machine-level instructions that may be executed by one or more processors, as well as data used by the machine-level instructions. The mapping table 202 may map various functions found within the program to memory addresses (or a range of memory addresses) within the system memory corresponding with the various functions. The mapping table 202 may map a particular function to a range of memory addresses corresponding with one or more machine-level instructions to be replaced in the event that the particular function is instrumented. In one example, the first function 222 may map to a first address 224 within a first region 204 of the system memory. Data (e.g., corresponding with the first machine-level instruction for the first function or a set of one or more machine-level instructions for the first function) located within the first region 204 of the system memory may be copied to a second region 206 of the system memory. After the data has been copied to the second region 206 of the system memory, a pointer to the second region 206 of the system memory or a first jump command to the second region 206 may be written into the first region starting at the first address 224. A second jump command back to a second memory address after the first memory address 224 may be written to the second region 206 (e.g., if eight bytes were replaced, then the second memory address after the first memory address 224 may be equivalent to the first address 244 plus a nine byte offset).

In one embodiment, in order to insert a jump instruction that requires five bytes in system memory, more than five bytes may need to be replaced in system memory. For example, if starting at the first memory address 224 there are four one byte instructions followed by a fifteen byte instruction, then nineteen bytes corresponding with the five variable-length instructions may need to be written to the second region 206 of the system memory. The five instructions may comprise x86 instructions. After the nineteen bytes have been written to or copied to the second region 206 of the system memory, then the jump instruction may be written into the first region 204 starting at the first address 224.

In some cases, the mapping table 202 may provide a memory address for the first machine-level instruction for the first function 222 and a number of bytes (or a byte offset) corresponding with a set of one or more instructions to be replaced in the event that the first function 222 is instrumented. In other cases, the number of instructions to be replaced to instrument a function may be determined by reading the instructions located in system memory starting at a memory address for the first machine-level instruction for the function and identifying the instruction boundaries to determine the length of each instruction.

In one embodiment, when the first machine-level instruction is executed for the first function 222, program execution may be redirected to the second region 206 in which a function entrance profiling hook 208 may be called and executed. In one example, the program execution may be redirected via a jump instruction or a branch instruction inserted into the first region 204 starting at the first address 224. The function entrance profiling hook 208 may call various profiling functions for obtaining profiling information, such as function for generating a timestamp associated with the start of the function call. After the function entrance profiling hook has been executed, the data (i.e., the instructions originally stored within the system memory prior to the insertion of the instrumentation) may be executed. After the data has been executed, the second jump command may redirect program execution back to the next memory address within the first region 204 of the system memory corresponding with a machine-level instruction that was not copied to the second region 206. Prior to returning back to the function that called the first function 222, a function exit profiling hook 210 may be executed. The function exit profiling hook 210 may call various profiling functions for obtaining profiling information, such as functions for generating a timestamp associated with the end of the function call or for determining a time duration for the execution of the first function 222.

In one embodiment, the original return address may be modified to point to the function exit profiling hook 210. Program execution may be redirected back to the original return address after the function exit profiling hook 210 has completed. The original return address may be passed to the function exit profiling hook 210 via a system stack (e.g., the original return address may be pushed onto a stack). In another embodiment, a mapping table, such as mapping table 202 may store one or more return addresses corresponding with return instructions for the first function 222 within a system memory. Similar to how one or more machine-level instructions may be copied to a second region 206 in order to make room for a jump instruction associated with a function entrance profiling hook, one or more other machine-level instructions may be copied to a third region within the system memory to make room for a jump instruction associated with a function exit profiling hook. In one example, a set of one or more machine-level instructions ending at a return address may be copied to a third region of the system memory. After the set of one or more machine-level instructions ending at the return address has been copied to the third region of the system memory, a pointer to the third region of the system memory or a jump command to the third region may be written into the first region ending at the return address.

FIGS. 3A-3B depict one embodiment of a system memory and modifications made to the system memory for inserting instrumentation into a program. As depicted in FIG. 3A, system memory 302 includes a first range of memory addresses 304. The first range of memory addresses 304 stores machine-level instructions 41-44. The machine-level instruction to be executed after machine-level instruction 44 may be machine-level instruction 45. As depicted in FIG. 3B, the machine-level instructions 41-44 have been copied to a second region 312 within the system memory and new instructions 41-44 have been inserted or written to the first range of memory addresses 304. The new instructions 41-44 may redirect program execution to a profiling hook (e.g., a function entrance profiling hook). In one example, new instructions 41-44 may include a jump instruction to a memory address corresponding with the profiling hook. After the profiling hook has been executed, the machine-level instructions 41-44 that have been copied to the second region 312 may be executed. After the machine-level instructions 41-44 have been executed, then a jump command to a memory address corresponding with instruction 45 may be executed.

In some embodiments, instrumentation may be inserted into a system memory, such as system memory 302, by replacing machine-level instructions from a binary that have been loaded into the system memory. By modifying the machine-level instructions that have been loaded into the system memory, the binary or executable machine code generated by a compiler or linker need not by touched or otherwise modified in order to instrument a program's functions. In one example, a program profiler for monitoring a program may modify machine-level instructions stored in a system memory in order to monitor specific portions of the program (e.g., portions of the program associated with image processing or graphics rendering) or to monitor specific functions within the program. In another example, a program profiler may be used by a developer of a program in order to dynamically insert function entrance and exits hooks into specific functions or into functions that are part of a group or library (e.g., functions associated with an image processing library or with a graphical user-interface). As there is no build-time overhead required to insert function entrance and exit hooks, the developer may specify different functions to be instrumented while the program is running. In some cases, the program profiler may also automatically insert instrumentation into functions that have been identified as performance sensitive without requiring input from the developer (e.g., the top 50 functions that have consumed the most CPU time during a sampling time period may be instrumented).

Figure 4A:
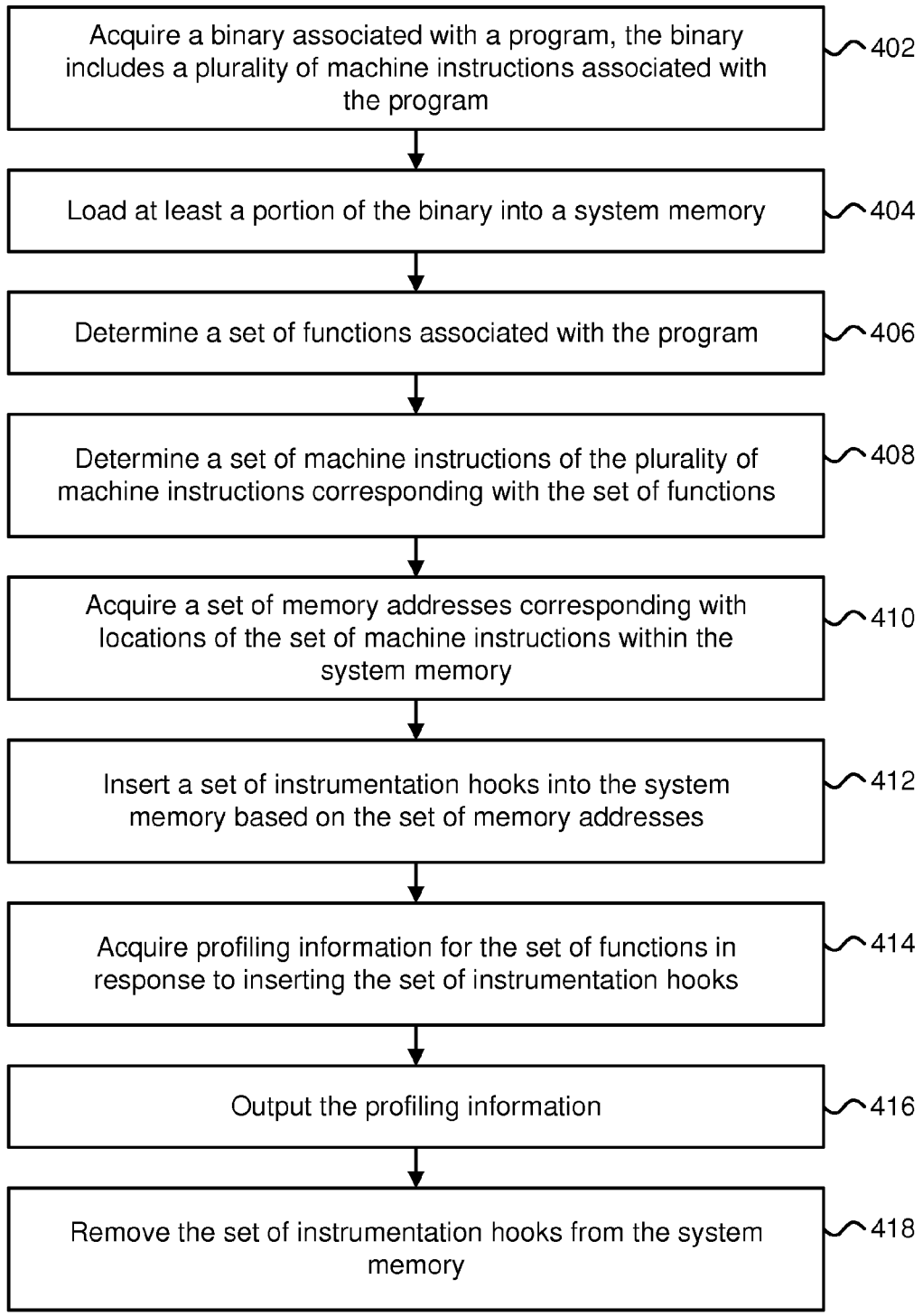
FIG. 4A is a flowchart describing one embodiment of a method for inserting instrumentation into a program.

FIG. 4A is a flowchart describing one embodiment of a method for inserting instrumentation into a program. In one embodiment, the process of FIG. 4A may be performed by a computing environment, such as computing environment 11 in FIG. 1.

In step 402, a binary associated with the program is acquired. The binary may include a plurality of machine instructions associated with the program. The binary may be acquired from a hard drive or data storage device. The binary may be generated from source code for the program using a compiler. The source code may be stored as one or more files containing program code. The source code may be written using a programming language such as C, C#, C++, Java, Lisp, or Smalltalk. The binary may also be generated by a linker that combines one or more object files into an executable file. In step 404, at least a portion of the binary is loaded into a system memory. In some cases, the entire binary may be loaded into the system memory. The system memory may comprise a RAM.

In step 406, a set of functions associated with the program is determined. In one embodiment, the set of functions may be selected by a program developer while debugging or developing the program. In another embodiment, the set of functions may be automatically determined based on previously obtained run-time statistics for the program. In one example, a survey of function performance metrics may be generated by instrumenting each function in the program over a survey time period (e.g., hooks may be inserted into each function within the program for one second and then removed).

In step 408, a set of machine instructions of the plurality of machine instructions corresponding with the set of functions is determined. The set of machine instructions may comprise the first machine instruction to be executed for each of the set of functions. In step 410, a set of memory addresses corresponding with locations of the set of machine instructions within the system memory is acquired. In one embodiment, the set of memory addresses may be acquired via a mapping table that maps the set of functions to memory addresses within the system memory. In another embodiment, the set of memory addresses may be acquired from debugging information (e.g., from program database files or PDB files) or from function export information contained within the binary.

In step 412, a set of instrumentation hooks is inserted into the system memory based on the set of memory addresses. In one example, execution of the program may be paused momentarily so that the set of instrumentation hooks may be inserted into the system memory without impacting the behavior of the program. The set of instrumentation hooks may be inserted into the system memory by modifying machine instructions stored within the system memory at the set of memory addresses to redirect program execution to program monitoring functions for generating profiling information. After the program monitoring functions have been executed, program execution may be redirected back to subsequent machine instructions stored within the system memory. One embodiment of a process for inserting hooks into a system memory is described later in reference to FIG. 4C.

In step 414, profiling information for the set of functions may be acquired in response to inserting the set of instrumentation hooks. The profiling information acquired may include function call counts, caller identification, callee identification, time stamps associated with entering and exiting a particular function, the time duration for each function call, and whether the time duration for a particular function call was greater than a baseline time duration by a threshold amount of time. In step 416, the profiling information may be outputted. The profiling information may be displayed on a computer monitor.

In step 418, the set of instrumentation hooks may be removed from the system memory. In one embodiment, the set of instrumentation hooks to be removed may be selected by a program developer while debugging or developing the program. In another embodiment, the set of instrumentation hooks to be removed may be automatically determined based on previously obtained run-time statistics for the program. In one example, a survey of function performance metrics may be generated by instrumenting each function in the program over a survey time period. In some cases, instrumentation hooks may be inserted into each function within the program for one second and then removed from those functions that do not satisfy various function performance metrics. In one example, instrumentation hooks may be automatically removed from functions that were never called during the survey time period (e.g., during a two second time period) or removed from functions whose cumulative execution time did not exceed a threshold execution time (e.g., functions whose cumulative execution time did not exceed 1% of the survey time period).

Figure 4B:
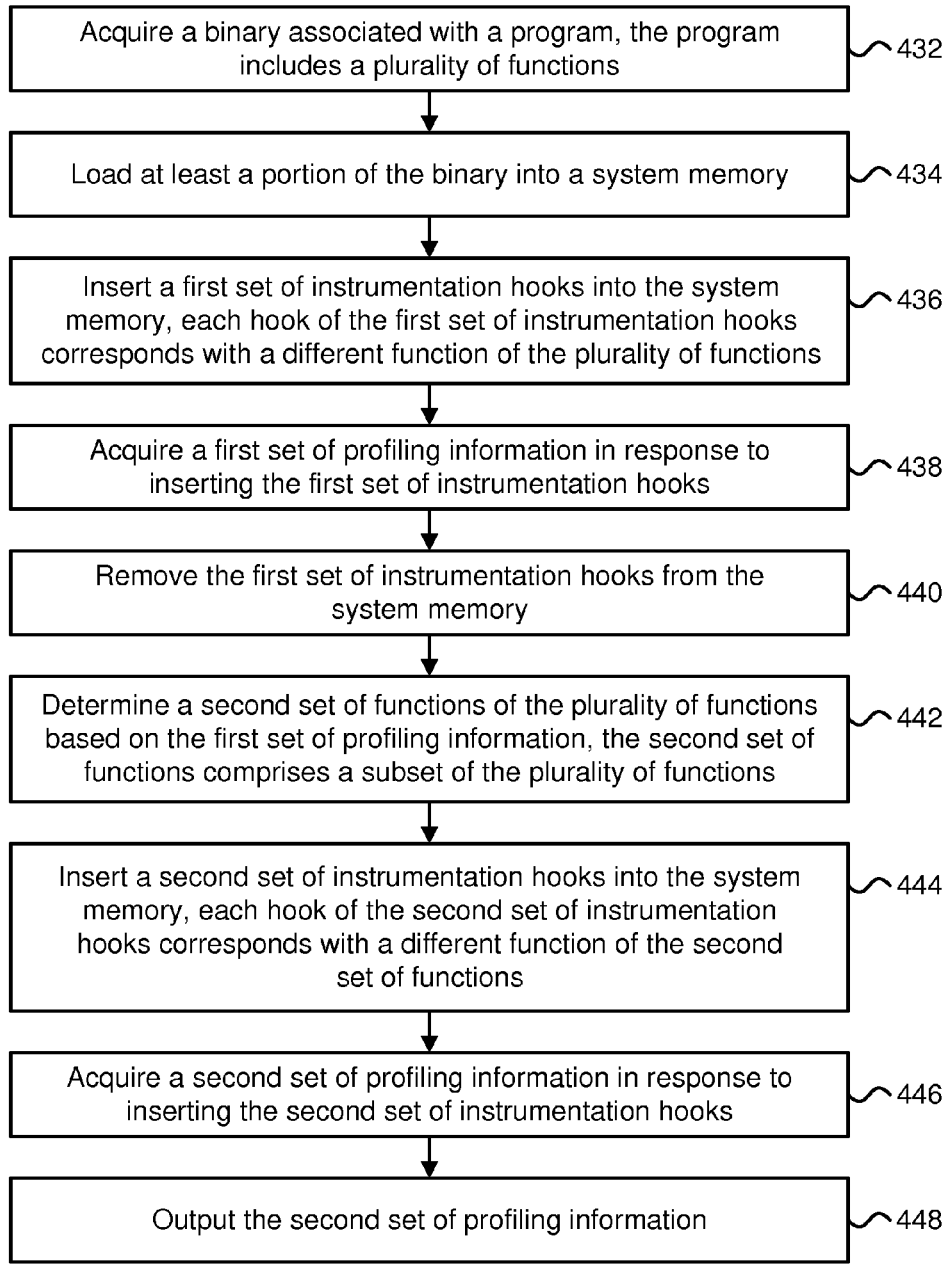
FIG. 4B is a flowchart describing an alternative embodiment of a method for inserting instrumentation into a program.

FIG. 4B is a flowchart describing an alternative embodiment of a method for inserting instrumentation into a program. In one embodiment, the process of FIG. 4B may be performed by a computing environment, such as computing environment 11 in FIG. 1.

In step 432, a binary associated with the program is acquired. The binary may include a plurality of computer executable instructions associated with the program. The program may include a plurality of functions. The binary may be acquired from a hard drive or data storage device. The binary may be generated from source code for the program using a compiler. The source code may be stored as one or more files containing program code. The source code may be written using a programming language such as C, C#, C++, Java, Lisp, or Smalltalk. The binary may also be generated by a linker that combines one or more object files into an executable file. In step 434, at least a portion of the binary is loaded into a system memory. In some cases, the entire binary may be loaded into the system memory. The system memory may comprise a non-volatile RAM or a volatile RAM.

In step 436, a first set of instrumentation hooks is inserted into the system memory. Each hook of the first set of instrumentation hooks may correspond with a different function of the plurality of functions. In one embodiment, the first set of instrumentation hooks may correspond with each function within the program. The first set of instrumentation hooks may correspond with each function that is called by the program or each function that is defined by source code used for generating the binary. The first set of instrumentation hooks may be in place during a survey time period for acquiring run-time statistics for each of the functions called by the program during the survey time period. In another embodiment, the first set of instrumentation hooks may correspond with only functions that are part of the program (e.g., if the program comprised a video game program, then only functions called by the video game program would be instrumented while general system related functions would not be instrumented).

In step 438, a first set of profiling information is acquired in response to inserting the first set of instrumentation hooks. The first set of profiling information may include function call counts, caller identification, callee identification, time stamps associated with entering and exiting a particular function, the time duration for each function call, and whether the time duration for a particular function call was greater than a baseline time duration by a threshold amount of time. In step 440, the first set of instrumentation hooks is removed from the system memory. In one embodiment, the first set of instrumentation hooks may be removed from the system memory by copying back the original machine instructions that were copied away in order to make room for the instrumentation hooks.

In step 442, a second set of functions of the plurality of functions is determined based on the first set of profiling information. In some cases, the second set of functions may be determined automatically without input from a developer. The second set of functions may comprise a subset of the plurality of functions. In one embodiment, each function of the second set of functions may comprise a function that was called at least a threshold number of times during a survey time period or whose cumulative execution time exceeded a threshold cumulative execution time during the survey time period.

In step 444, a second set of instrumentation hooks is inserted into the system memory. Each hook of the second set of instrumentation hooks may correspond with a different function of the second set of functions. In some cases, a set of memory addresses with which the second set of instrumentation hooks may be inserted within the system memory may be determined via a mapping table that maps the second set of functions to the set of memory addresses within the system memory. The set of memory addresses may also be acquired from debugging information (e.g., from program database files or PDB files) or from function export information contained within the binary. One embodiment of a process for inserting hooks into a system memory is described later in reference to FIG. 4C.

In step 446, a second set of profiling information is acquired in response to inserting the second set of instrumentation hooks. The second set of profiling information may include function call counts, caller identification, callee identification, time stamps associated with entering and exiting a particular function, the time duration for each function call, and whether the time duration for a particular function call was greater than a baseline time duration by a threshold amount of time. In step 448, the second set of profiling information is outputted. The second set of profiling information may be displayed on a computer monitor. The second set of profiling information may be displayed on a display, such as display 124 in FIG. 1.

Figure 4C:
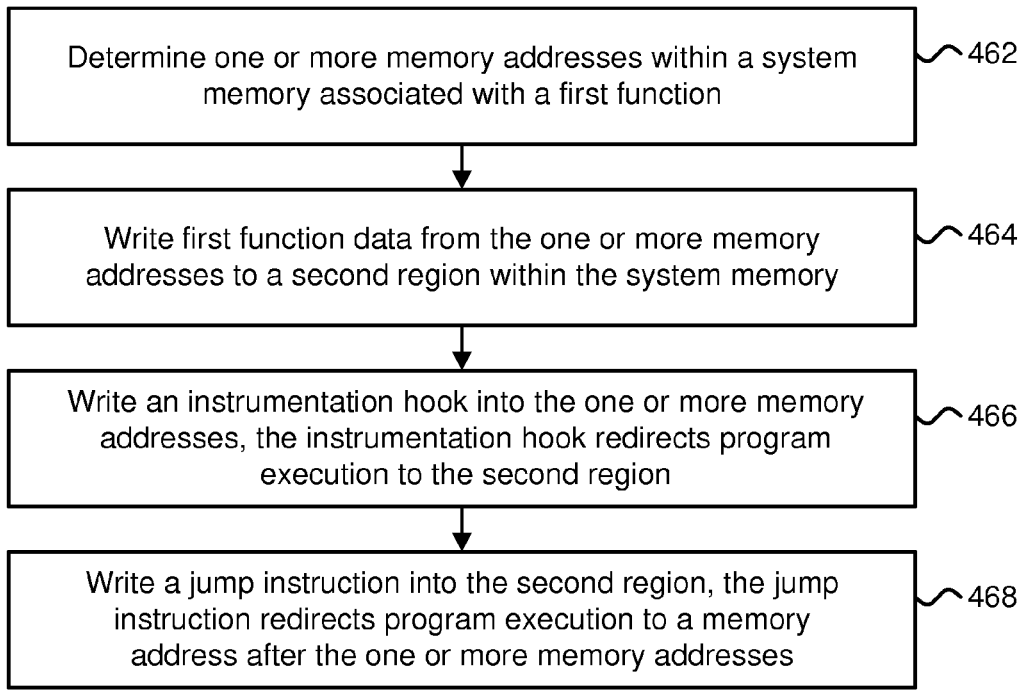
FIG. 4C is a flowchart describing one embodiment of a method for inserting a hook into a system memory.

FIG. 4C is a flowchart describing one embodiment of a method for inserting a hook into a system memory. The process described in FIG. 4C is one example of a process for implementing step 412 in FIG. 4A or for implementing step 444 in FIG. 4B. In one embodiment, the process of FIG. 4C may be performed by a computing environment, such as computing environment 11 in FIG. 1.

In step 462, one or more memory addresses within a system memory associated with a first function is determined. The one or more memory addresses may comprise a range of addresses. In one example, the range of addresses may cover a plurality of machine instructions stored in the system memory. The one or more memory addresses may include a first address corresponding with a first machine instruction for the first function. In some cases, the one or more memory addresses may be determined using a mapping table, such as mapping table 202 in FIG. 2. The mapping table may map the first function to one or more memory addresses corresponding with one or more machine-level instructions to be replaced in the event that the first function is instrumented. In addition, the one or more memory addresses may be determined from debugging information (e.g., from program database files or PDB files) or from function export information contained within the binary for a program.

In step 464, first function data from the one or more memory addresses is written to a second region within the system memory. The first function data may include one or more machine-level instructions for the first function. In some cases, the first function data may be written to a second memory different from or outside of the system memory. In one embodiment, one or more machine instructions stored within the one or more memory addresses may be written to the second region. In step 466, an instrumentation hook is written into the one or more memory addresses. The instrumentation hook may redirect program execution to the second region. In one example, the instrumentation hook may comprise a jump instruction or a jump command to a second memory address associated with the second region. In step 468, a jump instruction is written into the second region. The jump instruction may redirect (or jump) program execution to a memory address after the one or more memory addresses (e.g., corresponding with the next machine instruction to be executed). In one embodiment, when the first function is called, program execution will be redirected to the second region allowing functions for generating profiling information to be executed followed by a portion of the machine instructions for executing the first function (e.g., the machine instructions that were replaced and written to the second region will then be executed) followed by the jump instruction to return program execution back to other machine instructions for executing the first function that were not written to the second region.

One embodiment of the disclosed technology includes acquiring a binary associated with a program, loading at least a portion of the binary into a system memory, determining a set of functions associated with the program, determining a set of memory addresses within the system memory associated with the set of functions, inserting a set of instrumentation hooks into the system memory based on the set of memory addresses, acquiring profiling information for the set of functions in response to inserting the set of instrumentation hooks, and outputting the profiling information.

One embodiment of the disclosed technology includes identifying a first function associated with a program, determining a first memory address within a system memory corresponding with a first machine instruction to be executed for the first function, and inserting an instrumentation hook into the system memory based on the first memory address. The inserting an instrumentation hook includes writing a new instruction different from the first machine instruction into the system memory starting at the first memory address. The method further comprises acquiring profiling information for the first function in response to inserting the instrumentation hook into the system memory and outputting the profiling information.

In some cases, the inserting an instrumentation hook into the system memory may include writing an original first instruction located at the first memory address to a second region within the system memory prior to the writing a new instruction. The new instruction may comprise an instruction for redirecting program execution to the second region. The second region may include one or more instructions for generating the profiling information.

In some cases, the method further comprises identifying that the first function was called less than a threshold number of times based on the profiling information and removing the instrumentation hook from the system memory in response to identifying that the first function was called less than the threshold number of times.

One embodiment of the disclosed technology includes a system memory and one or more processors in communication with the system memory. The system memory stores at least a portion of a binary for the program. The one or more processors determine a first function associated with the program and determine a first memory address within the system memory corresponding with a first machine instruction to be executed for the first function when the first function is called. The binary includes the first machine instruction to be executed for the first function. The one or more processors cause a new instruction to be written into the system memory starting at the first memory address. The one or more processors acquire profiling information for the first function in response to writing the new instruction into the system memory.

One embodiment of the disclosed technology includes determining a first function associated with the program while the program is running, determining a first memory address within a system memory corresponding with a first machine instruction to be executed for the first function when the first function is called, and inserting an instrumentation hook into the system memory based on the first memory address. The inserting an instrumentation hook includes writing an original first instruction located at the first memory address to a second region within the system memory and writing a new instruction different from the original first instruction into the system memory starting at the first memory address. The new instruction comprises an instruction for redirecting program execution to the second region. The method further comprises acquiring profiling information for the first function in response to inserting the instrumentation hook into the system memory and outputting the profiling information.

Figure 5:
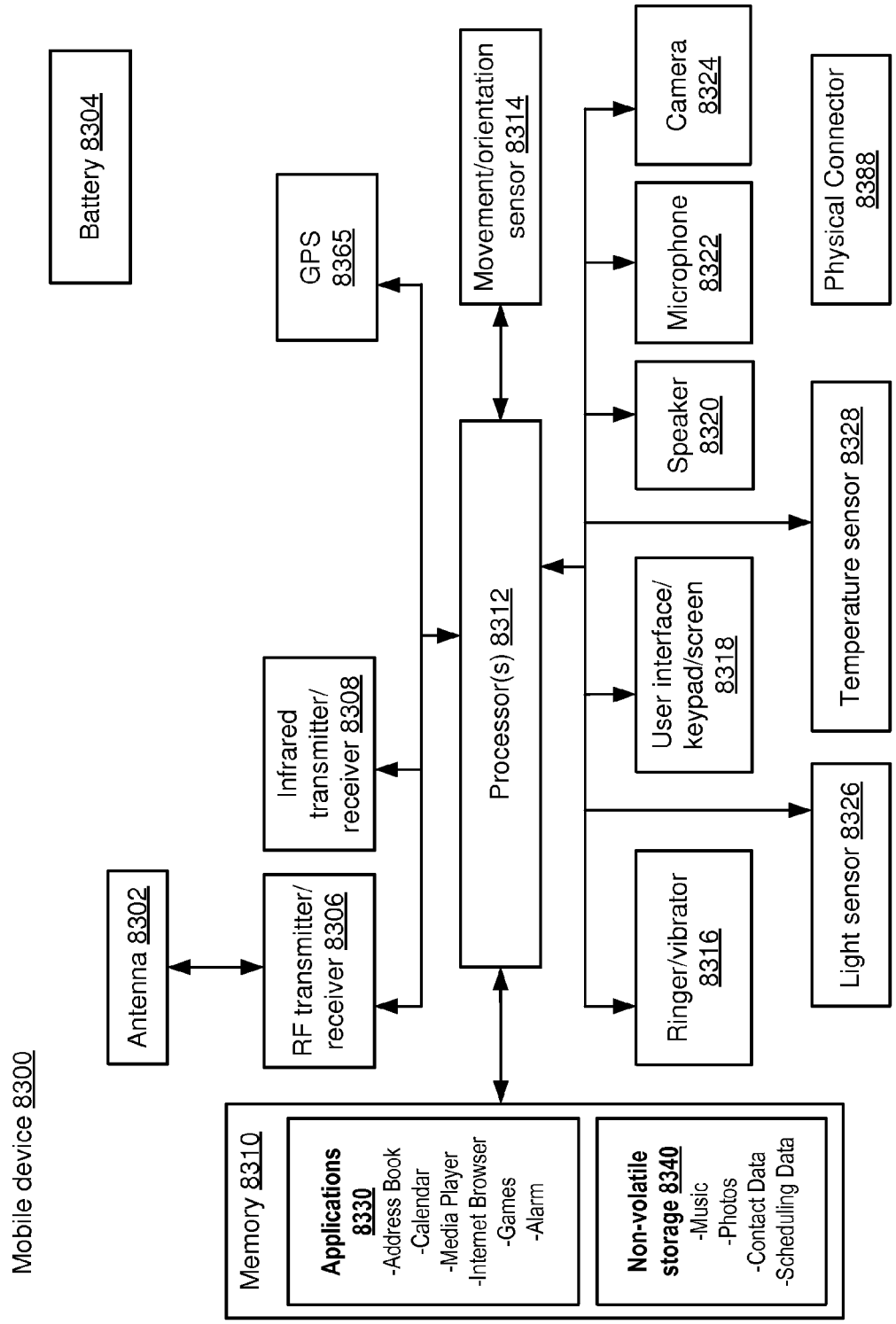
FIG. 5 is a block diagram of one embodiment of a mobile device.
Figure 6:
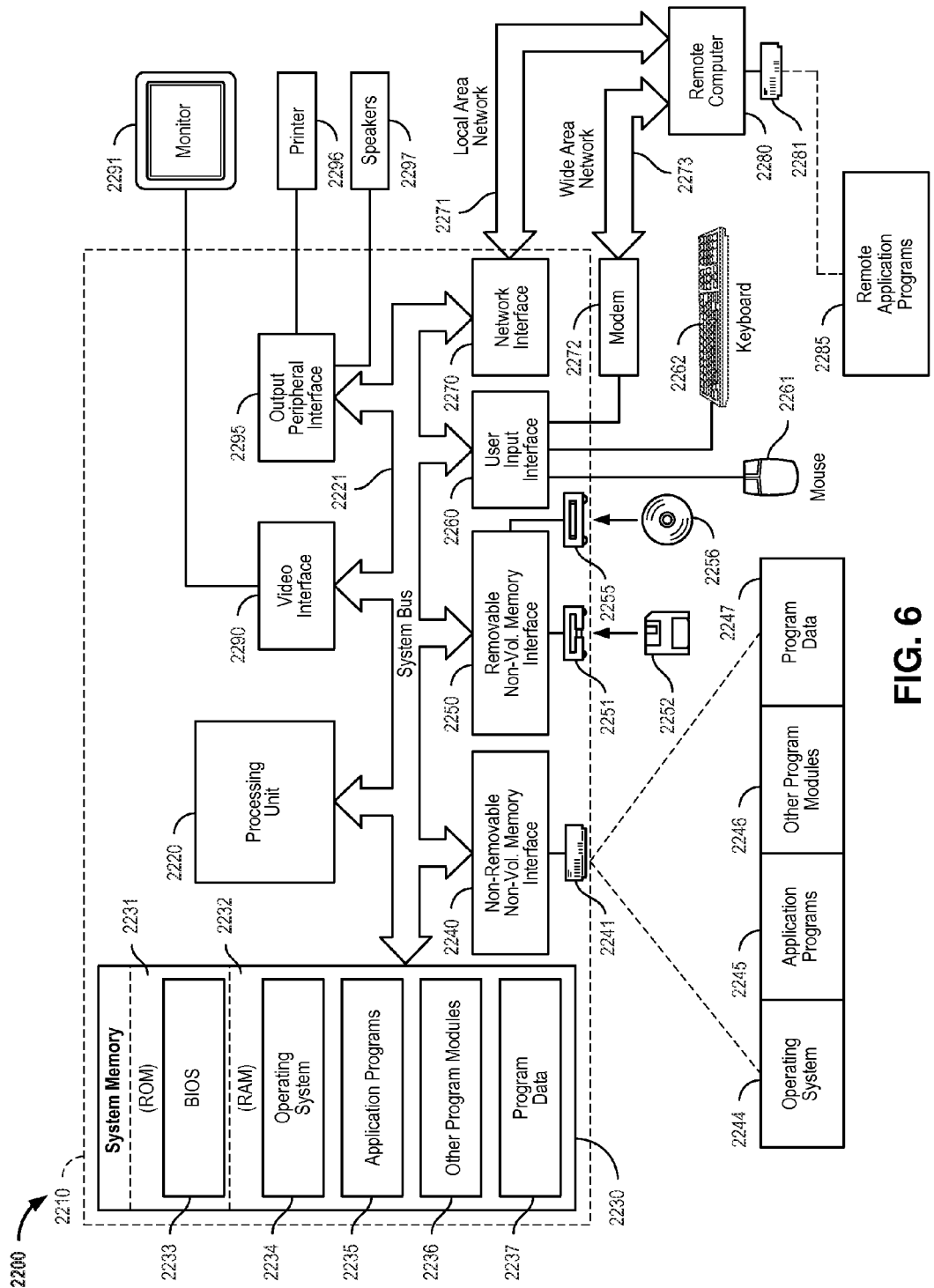
FIG. 6 is a block diagram of an embodiment of a computing system environment.

The disclosed technology may be used with various computing systems. FIGS. 5-6 provide examples of various computing systems that can be used to implement embodiments of the disclosed technology.

FIG. 5 is a block diagram of one embodiment of a mobile device 8300, such as mobile device 12 in FIG. 1. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

FIG. 6 is a block diagram of an embodiment of a computing system environment 2200, such as computing environment 11 in FIG. 1. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 6 illustrates operating system 2234, application programs 2235, other program modules 2236, and program data 2237.

The computer 2210 may also include other removable/non-removable, volatile/nonvolatile computer storage media. By way of example only, FIG. 6 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 6, provide storage of computer readable instructions, data structures, program modules and other data for the computer 2210. In FIG. 6, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 6. The logical connections depicted in FIG. 6 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 6 illustrates remote application programs 2285 as residing on memory device 2281. It will be appreciated that the network connections shown are exemplary and other means of establishing a communications link between the computers may be used.

The disclosed technology may be operational with numerous other general purpose or special purpose computing system environments. Examples of other computing system environments that may be suitable for use with the disclosed technology include, but are not limited to, personal computers, server computers, hand-held or laptop devices, multiprocessor systems, microprocessor-based systems, programmable consumer electronics, network PCs, minicomputers, mainframe computers, and distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same computing device or different computing devices as those used in other steps, and each step need not necessarily be performed by a single computing device.

For purposes of this document, reference in the specification to "an embodiment," "one embodiment," "some embodiments," or "another embodiment" may be used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for inserting instrumentation into a program, comprising:
   identifying a first function associated with the program;
   determining a first memory address within a system memory corresponding with a first machine instruction to be executed for the first function;
   inserting an instrumentation hook into the system memory based on the first memory address, the inserting an instrumentation hook includes writing a new instruction different from the first machine instruction into the system memory starting at the first memory address;
   acquiring profiling information for the first function during a particular time period in response to inserting the instrumentation hook into the system memory;
   determining that the first function ran within a baseline time duration during the particular time period based on the profiling information;
   removing the instrumentation hook from the system memory while the program is executing in response to determining that the first function ran within the baseline time duration;
   automatically inserting the instrumentation hook back into the system memory for a survey time period subsequent to the particular time period without user input;
   determining a second baseline time duration for the first function during the survey time period; and
   removing the instrumentation hook from the system memory while the program is executing in response to determining that the first function ran within the second baseline time duration.

2. The method of claim 1, wherein:
   the inserting an instrumentation hook into the system memory includes writing an original first instruction located at the first memory address to a second region within the system memory prior to the writing a new instruction, the new instruction comprises an instruction for redirecting program execution to the second region.

3. The method of claim 2, wherein:
   the second region includes one or more instructions for generating the profiling information.

4. The method of claim 2, further comprising:
   acquiring a binary associated with the program; and
   loading at least a portion of the binary into the system memory prior to the inserting an instrumentation hook into the system memory, the binary includes the original machine instruction.

5. The method of claim 1, further comprising:
   determining the baseline time duration based on run-time statistics for the program over the particular time period.

6. The method of claim 1, wherein:
   the automatically inserting the instrumentation hook back into the system memory includes automatically inserting instrumentation hooks into each function of the program for the survey time period without user input.

7. The method of claim 1, further comprising:
   identifying a set of functions based on their association with a particular group of functions within the program, the set of functions includes the first function.

8. The method of claim 7, wherein:
   the particular group of functions comprises functions associated with graphics rendering.

9. The method of claim 7, wherein:
   the particular group of functions comprises functions associated with an image processing library.

10. The method of claim 1, wherein:
    the inserting an instrumentation hook into the system memory includes writing one or more original machine instructions starting from the first address to a second region within the system memory and overwriting the one or more original machine instructions with one or more new machine instructions such that the one or more new machine instructions are executed first when the first function is called.

11. The method of claim 1, wherein:
    the inserting an instrumentation hook into the system memory includes writing an original machine instruction from the first address to a second region within the system memory and writing a jump instruction into the second region, the jump instruction redirects program execution to a memory address after the first memory address corresponding with the next machine instruction to be executed after the original machine instruction.

12. The method of claim 1, wherein:
    the system memory comprises a random-access memory from which one or more processors acquire instructions for execution;
    the new instruction comprises a jump instruction to a second memory address within the system memory;
    the profiling information includes information related to the frequency and duration of function calls for the first function; and
    the outputting the profiling information includes displaying the profiling information.

13. A system for inserting instrumentation into a program, comprising:
    a system memory configured to store at least a portion of a binary for the program; and
    one or more processors configured to determine a first function associated with the program and determine a first memory address within the system memory corresponding with a first machine instruction to be executed for the first function when the first function is called, the binary includes the first machine instruction to be executed for the first function, the one or more processors configured to cause a new instruction to be written into the system memory starting at the first memory address and acquire profiling information for the first function in response to writing the new instruction into the system memory, the one or more processors configured to determine that the first function ran within a baseline time duration during a particular time period subsequent to causing the new instruction to be written into the system memory and remove the new instruction from the system memory while the program is executing in response to determining that the first function ran within the baseline time duration, the one or more processors configured to automatically insert the instrumentation hook back into the system memory for a survey time period subsequent to the particular time period without user input and determine a second baseline time duration for the first function during the survey time period, the one or more processors configured to remove the instrumentation hook from the system memory while the program is executing in response to determining that the first function ran within the second baseline time duration.

14. The system of claim 13, wherein:
the one or more processors cause the first machine instruction to be executed for the first function located at the first memory address to be written to a second region within the system memory prior to the new instruction being written to the system memory at the first memory address, the new instruction comprises an instruction for redirecting program execution to the second region, the second region includes one or more instructions for generating the profiling information.

15. The system of claim 13, wherein:
the one or more processors determine that the first function was called less than a threshold number of times based on the profiling information, the one or more processors cause the first machine instruction to be written into the system memory at the first memory address in response to identifying that the first function was called less than the threshold number of times.

16. The system of claim 13, wherein:
the system memory comprises a random-access memory from which the one or more processors acquire instructions for execution;
the new instruction comprises a jump instruction to a second memory address within the system memory; and
the profiling information includes information related to the frequency and duration of function calls for the first function.

17. One or more hardware storage devices containing processor readable code for programming one or more processors to perform a method for inserting instrumentation into a program comprising the steps of:
determining a first function associated with the program while the program is running;
determining a first memory address within a system memory corresponding with a first machine instruction to be executed for the first function when the first function is called;
inserting an instrumentation hook into the system memory based on the first memory address, the inserting an instrumentation hook includes writing an original first instruction located at the first memory address to a second region within the system memory and writing a new instruction different from the original first instruction into the system memory starting at the first memory address, the new instruction comprises an instruction for redirecting program execution to the second region;
acquiring profiling information for the first function in response to inserting the instrumentation hook into the system memory;
determining that the first function ran within a baseline time duration during a particular time period subsequent to inserting the instrumentation hook based on the profiling information;
removing the instrumentation hook from the system memory while the program is running in response to determining that the first function ran within the baseline time duration;
automatically inserting the instrumentation hook back into the system memory for a survey time period subsequent to the particular time period without user input, the automatically inserting the instrumentation hook back into the system memory comprises automatically inserting instrumentation hooks into each function within the program for the survey time period;
determining a second baseline time duration for the first function during the survey time period; and
removing the instrumentation hook from the system memory while the program is executing in response to determining that the first function ran within the second baseline time duration.

18. The one or more hardware storage devices of claim 17, further comprising:
acquiring a binary associated with the program; and
loading at least a portion of the binary into the system memory prior to the inserting an instrumentation hook into the system memory, the binary includes the original first instruction, the second region includes one or more instructions for generating the profiling information.

19. The one or more hardware storage devices of claim 17, further comprising:
identifying that the first function was called less than a threshold number of times based on the profiling information; and
removing the instrumentation hook from the system memory in response to identifying that the first function was called less than the threshold number of times.

20. The one or more hardware storage devices of claim 17, wherein:
the inserting an instrumentation hook into the system memory includes writing a jump instruction into the second region, the jump instruction redirects program execution to a memory address after the first memory address corresponding with the next machine instruction to be executed after the original first instruction.

* * * * *